US012664996B2

(12) United States Patent
Tamir et al.

(10) Patent No.: US 12,664,996 B2
(45) Date of Patent: Jun. 23, 2026

(54) SHORT-CYCLE FREQUENCY DETECTOR

(71) Applicant: Nuvoton Technology Corp., Hsin-chu (TW)

(72) Inventors: Itamar Tamir, Tel Aviv (IL); Ittai Barkai, Tel Aviv (IL)

(73) Assignee: Nuvoton Technology Corp., Hsinchu (TW)

( * ) Notice: Subject to any disclaimer, the term of this patent is extended or adjusted under 35 U.S.C. 154(b) by 188 days.

(21) Appl. No.: 18/652,834

(22) Filed: May 2, 2024

(65) Prior Publication Data

US 2025/0342853 A1 Nov. 6, 2025

(51) Int. Cl.

| | |
|---|---|
| ***G10L 25/18*** | (2013.01) |
| ***G10L 25/09*** | (2013.01) |
| ***G10L 25/30*** | (2013.01) |
| ***H04R 3/00*** | (2006.01) |
| ***H04R 3/04*** | (2006.01) |

(52) U.S. Cl.

CPC .............. *G10L 25/18* (2013.01); *G10L 25/09* (2013.01); *G10L 25/30* (2013.01); *H04R 3/04* (2013.01)

(58) Field of Classification Search

None

See application file for complete search history.

(56) References Cited

U.S. PATENT DOCUMENTS

| | | | | |
|---|---|---|---|---|
| 10,559,316 | B2 | 2/2020 | Cassidy et al. | |
| 11,322,167 | B2 | 5/2022 | Healy et al. | |
| 11,574,628 | B1 | 2/2023 | Kumatani et al. | |
| 11,941,083 | B2 | 3/2024 | Barkai et al. | |
| 2018/0115824 | A1* | 4/2018 | Cassidy | H04R 3/007 |
| 2018/0367929 | A1* | 12/2018 | Lesso | H04R 29/00 |
| 2019/0287550 | A1 | 9/2019 | Lim | |
| 2020/0012932 | A1* | 1/2020 | Wang | G06N 3/0495 |
| 2022/0036915 | A1* | 2/2022 | Koretzky | G10L 21/12 |
| 2023/0136220 | A1 | 5/2023 | Barkai et al. | |

(Continued)

FOREIGN PATENT DOCUMENTS

CN 114067838 A * 2/2022 ............. G06N 3/045

OTHER PUBLICATIONS

McCarthy, Bob, "Time & Phase Alignment: Inside Two Principal Concepts of System Optimization". Website: https://www.prosoundweb.com/time-phase-alignment/ Date:Jun. 6, 2022. pp. 1-11. (Year: 2022).*

(Continued)

*Primary Examiner* — Qin Zhu

(74) *Attorney, Agent, or Firm* — Meitar Patents Ltd.; Daniel Kligler

(57) ABSTRACT

A system includes a memory and processor. The memory is configured to store a machine learning (ML) model that is trained to estimate values of frequencies added (FA) in sparse input signals that have been derived from respective input audio signals, the sparse input signals being indicative of one or more FA in the corresponding input audio signals. The processor is configured to (i) receive an input audio signal, (ii) derive from the input audio signal a sparse input signal indicative of the FA in the input audio signal, and (iii) estimate the values of the FA in the input audio signal by applying the trained ML model to the sparse input signal.

23 Claims, 5 Drawing Sheets

(56) References Cited

U.S. PATENT DOCUMENTS

2023/0197043 A1 * 6/2023 Martinez Ramirez ....................... G10H 3/187 381/61

OTHER PUBLICATIONS

Williams, "Measuring Total Harmonic Distortion (THD)," Technical Article, AAC—All About Circuits, pp. 1-8, Feb. 20, 2017, as uploaded from https://www.allaboutcircuits.com/technical-articles/the-importance-of-total-harmonic-distortion/.

Poudel et al., "Solar Power Prediction Using Deep Learning Technique," Advanced Science and Technology Letters, vol. 146 (FGCN 2017), pp. 148-151, year 2017.

U.S. Appl. No. 17/938,986 Office Action dated Jun. 28, 2024.

* cited by examiner

SHORT-CYCLE FREQUENCY DETECTOR

FIELD OF THE INVENTION

The present invention relates generally to processing of audio signals, and particularly to methods and systems for audio signal frequency measurement.

BACKGROUND OF THE INVENTION

An audio system is typically regarded as "high quality" if the ratio of the audio artifacts added to the input signal, the artifact being a by-product of the system itself, is kept to a minimum. Such artifacts can be divided non-harmonic into noise, distortion, and harmonic distortion. Sensing and quantifying such artifacts are needed both for designing better systems and for providing real-time control of automatic-tuning systems.

Quantifying signal quality using Machine Learning (ML) was previously reported in the patent literature. For example, U.S. Patent Application Publication 2023/0136698, which is assigned to the assignee of the present patent application, describes a system including a memory and a processor. The memory is configured to store an ML model. The processor is configured to (i) obtain a set of training audio signals that are labeled with respective levels of distortion, (ii) convert the training audio signals into respective images, (iii) train the ML model to estimate the levels of the distortion based on the images, (iv) receive an input audio signal, (v) convert the input audio signal into an image, and (vi) estimate a level of the distortion in the input audio signal, by applying the trained ML model to the image.

As another example, U.S. Patent Application Publication 2023/0136220, which is also assigned to the assignee of the current application, describes a system including a memory and a processor. The memory is configured to store an ML model. The processor is configured to (i) obtain a set of training audio signals in the form of a plurality of initial audio signals, which have first durations in a first range of durations and which are labeled with respective levels of distortion, (ii) train the ML model to estimate the levels of the distortion based on the training audio signals, (iii) receive an input audio signal having a duration in a second range of durations, shorter than the first durations, and (iv) estimate a level of the distortion in the input audio signal by applying the trained ML model to the input audio signal.

SUMMARY OF THE INVENTION

An embodiment of the present invention that is described hereinafter provides a system including a memory and processor. The memory is configured to store a machine learning (ML) model that is trained to estimate values of frequencies added (FA) in sparse input signals that have been derived from respective input audio signals, the sparse input signals being indicative of one or more FA in the corresponding input audio signals. The processor is configured to (i) receive an input audio signal, (ii) derive from the input audio signal a sparse input signal indicative of the FA in the input audio signal, and (iii) estimate the values of the FA in the input audio signal by applying the trained ML model to the sparse input signal.

In an embodiment, the processor is configured to derive the sparse input signal from the input audio signal by retaining portions of the input audio signal around zero-crossings of the input audio signal and discarding other portions of the input audio signal.

In another embodiments, the processor is configured to derive the sparse input signal from the input audio signal by retaining portions of the input audio signal around extremums of the input audio signal and discarding other portions of the input audio signal.

In yet another embodiment, the processor is configured to derive the sparse input signal from the input audio signal by retaining portions of the input audio signal around steepest portions of the input audio signal and discarding other portions of the input audio signal.

In an embodiment, the processor is further configured to derive the sparse input signal from the input audio signal by applying an initial step of phase aligning of the input audio signal.

In an embodiment, the processor is configured to estimate the values of the FA by detecting frequencies of one or more higher harmonic of the input audio signal.

In some embodiments, the processor is configured to obtain the input audio signal by receiving the input audio signal.

In some embodiments, the processor is further configured to filter-out a DC component from the input audio signal.

In an embodiment, the processor is further configured to normalize the input audio signal.

In some embodiments, the ML model includes one of a convolutional neural network (CNN) and a recursive neural network (RNN).

In some embodiments, the processor is further configured to control, using the estimated level of the frequency error, an audio system that produces the input audio signal.

There is additionally provided, in accordance with another embodiment of the present invention, a system, including a memory and a processor. The memory is configured to store a machine learning (ML) model. The processor is configured to (i) obtain a plurality of audio signals that are labeled according to respective levels of frequency errors in the signals, (ii) derive from the plurality of audio signals a respective plurality of sparse training signals, each sparse training signal being indicative of one or more frequencies in a corresponding audio signal, and (iii) using the sparse training signals, train the ML model to estimate the levels of the frequency errors.

In some embodiments, the processor is configured to obtain the plurality of audio signals by receiving initial audio signals that have first durations, and slicing the initial audio signals into slices having second durations, shorter than the first durations.

In an embodiment, the processor is further configured to filter-out a DC component from each of the plurality of audio signals.

In another embodiment, the processor is further configured to normalize each of the plurality of audio signals.

In some embodiments, the ML model includes one of a convolutional neural network (CNN) and a recursive neural network (RNN).

In some embodiments, the CNN classifies the frequency errors according to the values of the FA that label the audio signals.

There is further provided, in accordance with another embodiment of the present invention, a method including storing in a memory a machine learning (ML) model that is trained to estimate values of frequencies added (FA) in sparse input signals that have been derived from respective input audio signals, the sparse input signals being indicative of one or more FA in the corresponding input audio signals.

An input audio signal is received. A sparse input signal is derived from the input audio signal, the sparse signal indicative of the FA in the input audio signal. Values of the FA in the input audio signal are estimated by applying the trained ML model to the sparse input signal.

There is also provided, in accordance with another embodiment of the present invention, a method including storing in a memory a machine learning (ML) model. A plurality of audio signals is obtained, that are labeled according to respective values of frequencies added (FA) in the signals. A respective plurality of sparse training signals is derived from the plurality of audio signals, each sparse training signal being indicative of one or more FA in a corresponding audio signal. Using the sparse training signals, the ML model is trained to estimate the values of the FA.

The present invention will be more fully understood from the following detailed description of the embodiments thereof, taken together with the drawings in which:

DETAILED DESCRIPTION OF EMBODIMENTS

Overview

Figure 1:
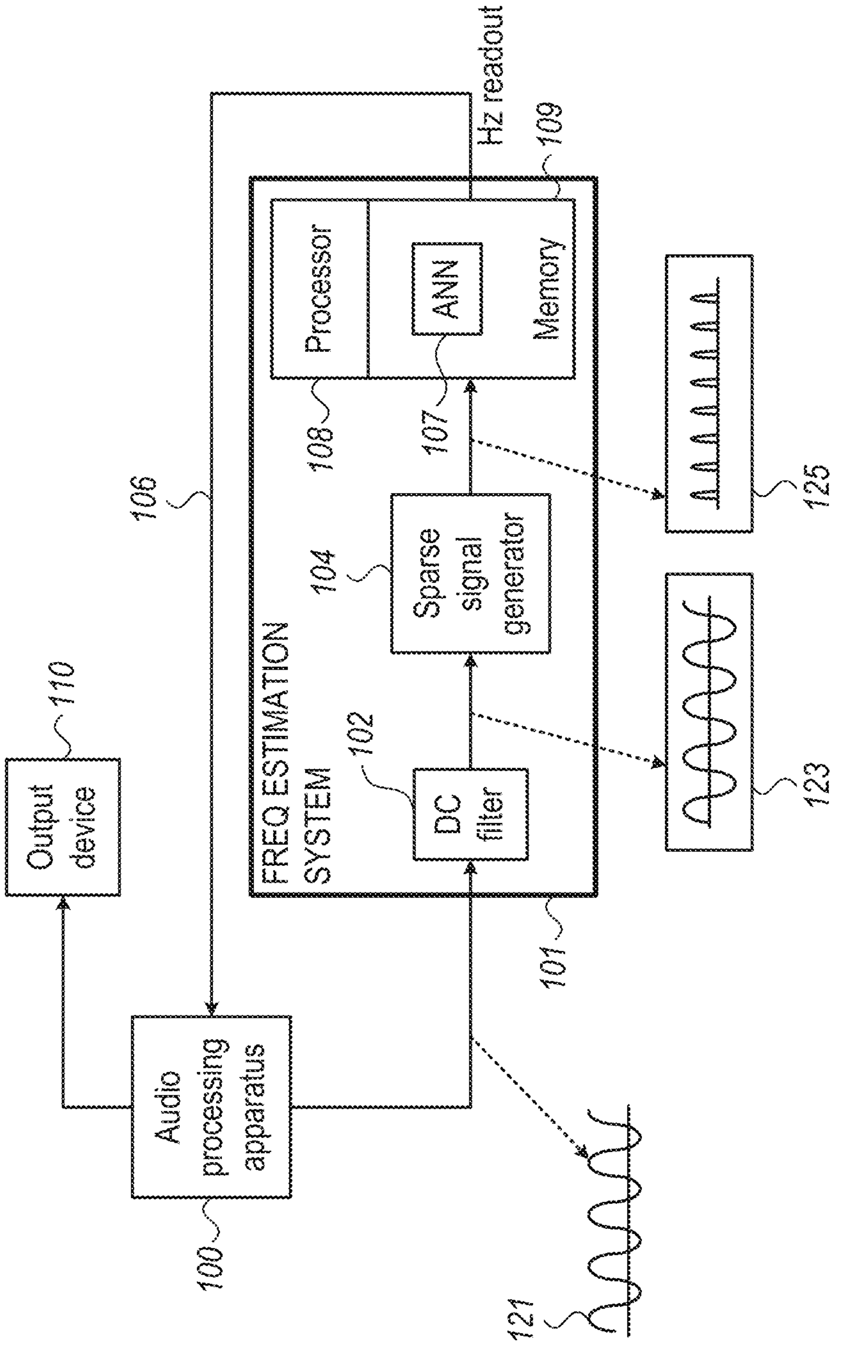
FIG. 1 is a block diagram schematically illustrating a system for estimation of frequencies of one or more added harmonics in a short audio sample output by an audio processing apparatus, in accordance with an embodiment of the present invention.

Audio signals (e.g., music or voice) are primarily a form of acoustic energy. For consumer technology products, this energy is usually converted into the digital domain for different manipulations, such as saving, processing, and broadcasting. Such manipulations may cause distortions which are usually considered negative artifacts. Measuring such distortions with contemporary high-accuracy analyzers is limited, since achieving this high accuracy requires analyzers to take a relatively long measurement, which, typically in the industry, is ~667 msec. One such distortion results in small changes (i.e., errors) in one or more harmonics of a given fundamental (e.g., base) frequency. As the original signal can be composed of many base frequencies, such as one or more added harmonics can cover a wide range of frequencies. For simplicity, most of this disclosure considers a given base frequency of 1 KHz. By extension the disclosed technique applies to set of base frequencies.

Some embodiments of the present invention that are described hereinafter provide a machine learning (ML) based technique for the detection of the frequencies of one or more added harmonics in a signal, e.g., an odd or even higher harmonic added to the fundamental frequency. This technique can then, mutatis mutandis, be broad-banded for the detection of any number of added harmonics. By using an ML algorithm, a processor can offer a faster means of identification of the added frequencies while keeping high accuracy and with little or no sensitivity to signal noise.

In one embodiment, the processor uses a trained artificial neural network (ANN) to detect a value of a frequency of an added harmonic added to a base (fundamental) frequency of a test input audio signal (e.g., a 1 kHz pure sine wave) and numerically quantify the added harmonic frequency to a typical accuracy of 0.1% within a very short time duration of several cycles, e.g., five cycles of the audio signal. For a 1 kHz base signal, this duration extends over 5 msec. Conventional analyzers, commercially used in the market, require a much longer time (~600 cycles) for the same test signal to provide similar results.

To efficiently train an ML model, a processor applies a preprocessing step, comprising deriving a set of sparse training signals from a set of labeled short audio signals, each signal having a known FE in an added frequency of a harmonic. (Typically, any added harmonic signal will have sufficiently higher frequency than the fundamental harmonic, e.g., at least 10% larger. Smaller frequency difference in contributions in the fundamental frequency can be considered as jitter or timing errors in the base signal.)

In some examples, a given sparse training signal is indicative of the frequencies in the corresponding audio signal from which it was derived. In one example the indication of the frequencies is given by a sparse signal comprising a sequence of signal portions around zero-crossings of the corresponding audio signal. In another example, the sparse signals capture extremums of the signals to indicate frequencies. In yet another example, the sparse signals capture signal regions having steepest change of the signal to indicate frequencies.

The sparse training signals retain the relevant added frequencies information of the input audio signals but are considerably smaller in size and simpler to process. The set of labeled sparse training signals can be derived from the short audio signals by various methods, as described above (e.g., around zeroes, around extremums and around steepest regions of the input signal).

In one example, the sparse training signal is derived from the short audio signal by maintaining the audio signal around each zero-crossing interval and discarding the signal elsewhere. In another example, the sparse training signal is derived from the short audio signal by generating a function having a spike at the zero crossing and discarding the short audio signal elsewhere.

An additional step that may be used to reduce the training workload is to apply a phase alignment, such as zero-crossing-alignment preprocessing step, to the set of labeled short audio signals. The phase aligned, e.g., zero-crossed aligned training, set is much more efficient to use than the original short audio signals, as it saves the processor from considering most of the irrelevant data points (i.e., much of the signal). Other ways to phase align the input signals may rely on extremums-alignment or on alignment of steepest change portions of signals.

In one example, the initial data set for training comprises harmonic audio samples of a base (i.e., fundamental) frequency of 1 kHz. (In this disclosure the words "audio signal" and "audio sample" are considered equivalent and therefore used interchangeably). To simulate higher harmonics in the audio samples, a harmonic signal of higher frequency, randomized within the range (1.09, 9) kHz, is added to the samples. The minimal level of added harmonics is at least 1% of the fundamental signal amplitude.

To further simulate real-world scenarios, a random noise is added having an amplitude up to 1% of fundamental signal amplitude. The set of audio samples is repeated with ten different randomized phase values (phase between the base frequency and the added frequency). In total, the exemplified ML model is trained by a set of ~200,000 sparse signals derived from the respective short audio samples. Increasing the database to several million or more will improve detection accuracy.

In the inference phase, the trained system receives an input audio signal having a short duration (e.g., under 10 msec) that may include one or more added harmonics. After deriving the respective sparse signal, the system estimates the level of distortion in the input audio signal (e.g., List of the one or more harmonic frequencies added). Example simulated results show about 5 percent accuracy. The base Harmonic frequency signal is typically more accurate than the distortion which might be non-harmonic, noise, etc. Thus, the disclosed technique is applied to the detection of harmonics added to a fundamental frequency and not for quantifying a jitter or clock related issue, in which the fundamental frequency is altered due to system errors.

The disclosed technique can be applied to analyze audio signals either offline or in real time. The exemplified system is beneficial, for example, for accurate system analysis (product design stages) as well as in real-time control of correcting distortion due to spurious harmonics added in audio systems.

System Description

FIG. 1 is a block diagram schematically illustrating a system 101 for estimating frequencies of one or more added harmonics of a short audio sample output by an audio processing apparatus 100, in accordance with an embodiment of the present invention. An output signal from audio processing apparatus 100 is directed to an output device 110, such as a loudspeaker. The output of system 101 is used to correct errors in the frequency domain in apparatus 100 so it outputs a higher quality signal to an output device 110.

To train an ML model ANN 107 (e.g. an RNN or a 1D CNN), a processor 108 of system 101 uses a labeled set of short training signals 125, each signal having a known frequencies of higher harmonics added to the fundamental harmonic. To begin, system 101 receives short audio signals 121. Alternatively, the system may receive long signals and slice the initial audio signals into slices of shorter durations to produce an initial set of training audio signals.

To reduce irrelevant variance among the signals, the system applies DC filter 102 to remove DC offset from signals, such as signals 121, and then generate signals similar to signals 123.

A preprocessing step is done on signals 123 by a sparse signal generator 104, which transforms each short audio signal 123 to a respective sparse signal 125, ranging, for example, about zero-crossing points only. Sparse signal generator 104 may also remove the different phases and latencies between the sparse training signals. This phase alignment preprocessing step eliminates an unnecessary search for a zero crossing over a full cycle of the signals during training. It is far more efficient to use sparse signals 125, rather than signals 123, to train an ML model to detect and estimate the one or more added frequencies.

In an optional embodiment, sparse signal generator 104 initially applies a zero-crossing-alignment preprocessing step (e.g., to align between phases) to the set of labeled short audio signals 123. The zero-crossed aligned signals 123 can be then made sparse by sparse signal generator 104 more efficiently, as all zero-crossing-aligned signals start at a similar initial amplitude and phase.

Next, a circuitry implemented in a processor 108 digitizes sparse signal 125 and, if required, normalizes the waveform of a sparse signal 125. The circuitry digitizes the initial signals and normalizes the digitized initial signals using a given minimal digital precision level, such as 8-bit. With a higher precision level (e.g., 24-bit) much better precision would be achieved.

In a training phase, processor 108 runs an algorithm that optimizes (e.g., determines weights of) ANN 107, and stores the optimized ANN in a memory 109.

During inference, system 101 is configured for a one-dimensional (1D) estimation of one more added frequencies in a short audio sample, similar to one of signals 121. Processor 108 runs the trained ANN 107, held in memory 109, to perform inference on audio signal 125 to the frequency domain error in the signal. In one embodiment, RNN 107 is an LSTM ANN.

Finally, a feedback line 106 between processor 108 and audio processing apparatus 100 enables controlling in real-time the amount of frequencies-added (FA) in the output audio signal, based on the estimated added frequencies.

The different elements of system 101 and audio processing apparatus 100 shown in FIG. 1 may be implemented using suitable hardware, such as one or more discrete components, one or more Application-Specific Integrated Circuits (ASICs) and/or one or more Field-Programmable Gate Arrays (FPGAs). Some of the functions of system 101, e.g., the functions of processor 108, may be implemented in one or more general-purpose processors programmed in software to carry out the functions described herein. The software may be downloaded to the processors in electronic form, over a network, or from a host, for example, or it may, alternatively or additionally, be provided and/or stored on non-transitory tangible media, such as magnetic, optical, or electronic memory.

The embodiment of FIG. 1 is depicted by way of example, purely for the sake of clarity. Any other suitable configuration can be used in alternative embodiments. For example, the preprocessing circuitry may perform another type of preprocessing of the initial training samples 121.

Short Audio Signals for Determination of FE Using an ANN

Figure 2:
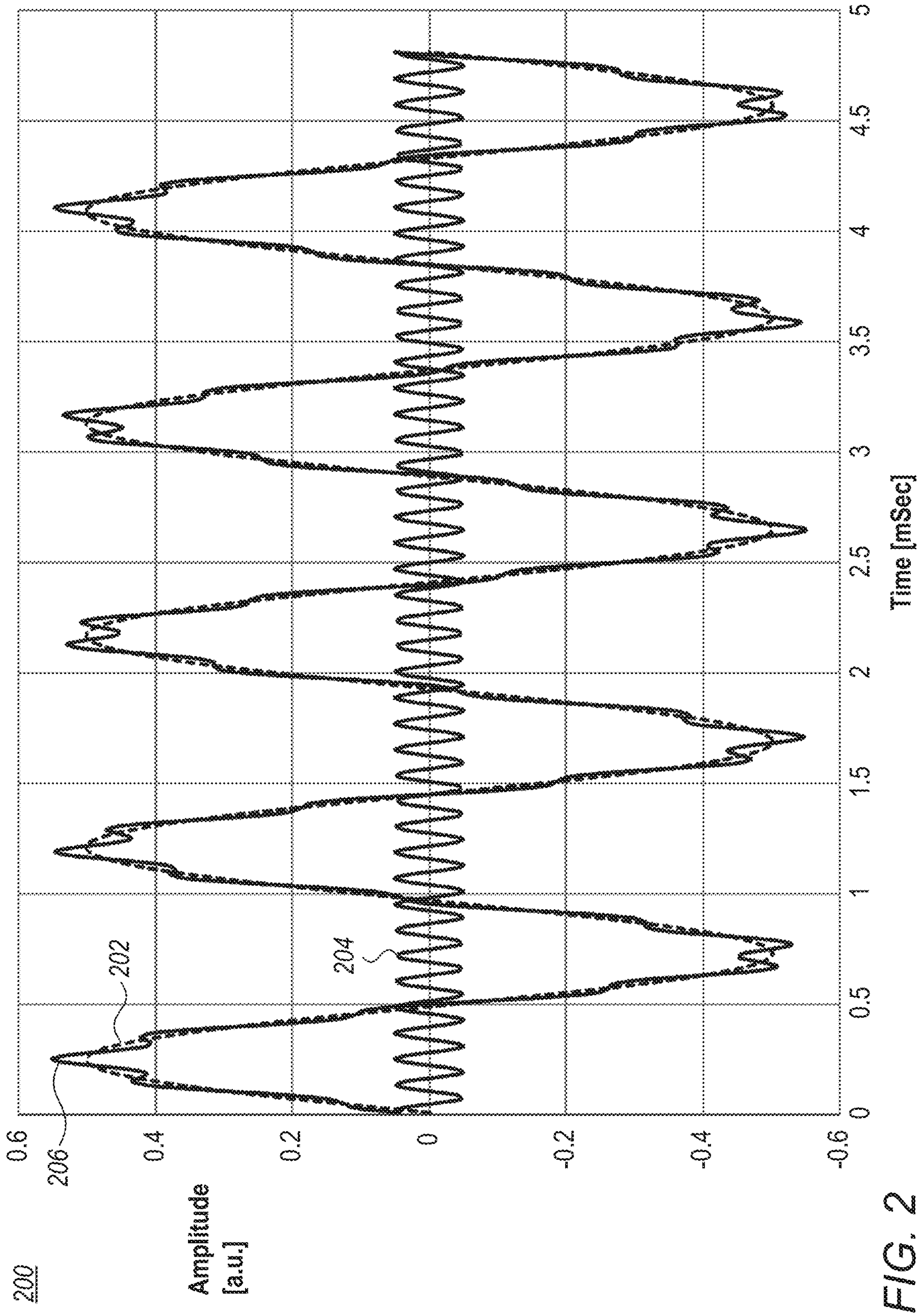
FIG. 2 is a graph showing a short audio signal with a frequency-added (FA), in accordance with an embodiment of the present invention.

FIG. 2 is a graph 200 showing a short audio signal 206 with a frequency added (FA), in accordance with an embodiment of the present invention. Short audio signal 206 is generated by adding a harmonic 204 to a base frequency signal 202 of 1 KHz and amplitude −6 [dB] (~0.5 peak level). In FIG. 2, the added harmonic 204 is at −33 [dB] (~0.022 peak level, enhanced in the plot to be visible), having a frequency of 7,850 [Hz] and a randomly provided phase value.

If the initial signals are long (e.g., lasting several hundred cycles), the system truncates (e.g., slices) the training audio samples, leaving only several (e.g., five) cycles. Thus, the training uses short-duration samples (e.g., the five cycles of a 1 kHz wave), with the total duration of each sample being 5 msec. This duration is considered very short and does not allow, for example, meaningful FFT analysis of harmonic distortion, as emphasized above.

Figure 3:
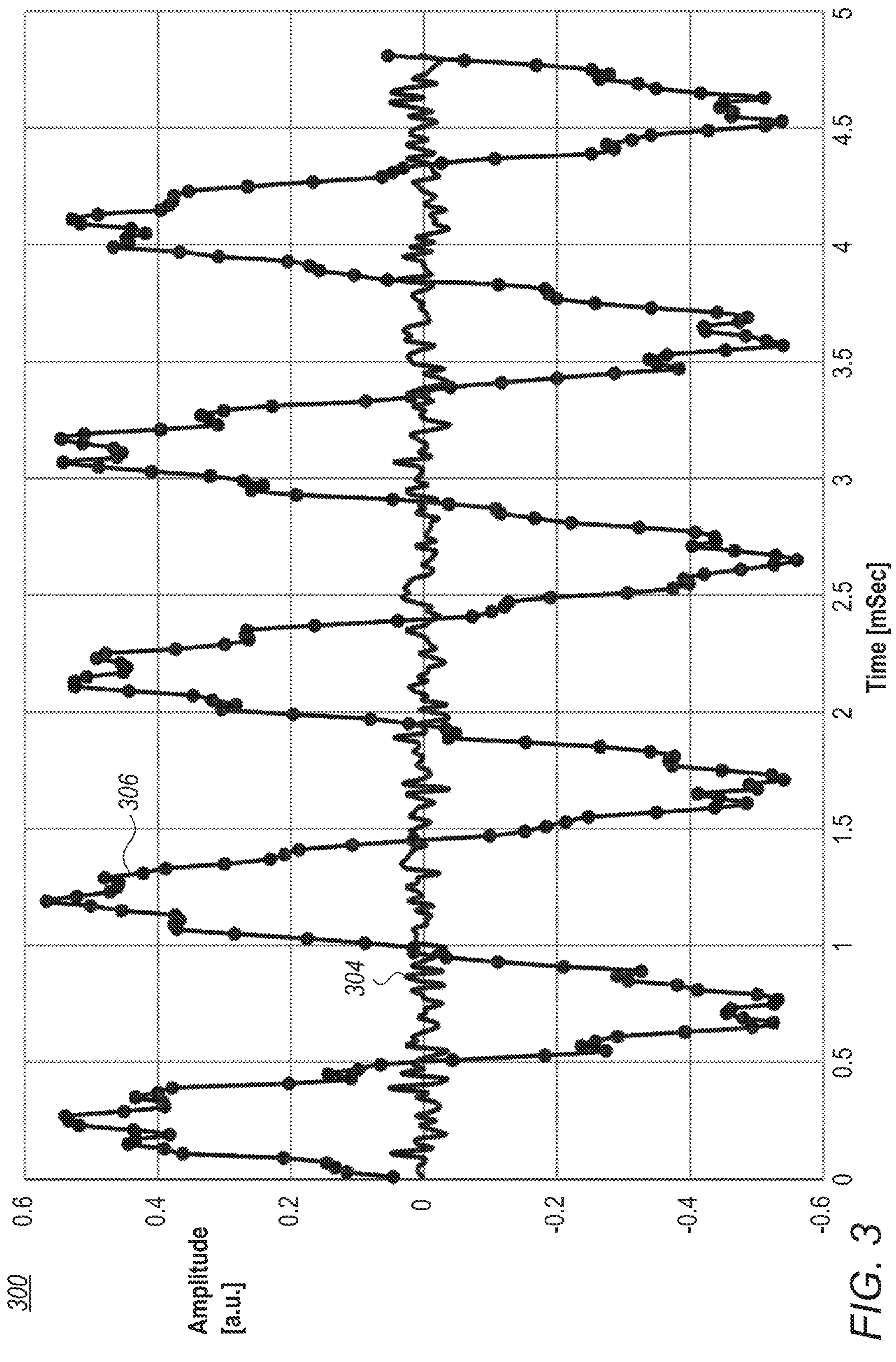
FIG. 3 is a graph showing an example of a short signal with additional noise produced from the short audio signal of FIG. 2, in accordance with an embodiment of the present invention.

FIG. 3 is a graph 300 showing an example of a realistic short audio signal 306 having additional noise 304, produced from the short audio signal 206 of FIG. 2, in accordance with an embodiment of the present invention.

The actual noise level (enhanced in the plot to be visible) is at a level of −82.1 [dB] (about 7.8E-5 of signal 206 peak amplitude level).

In one example, after transforming the set of signals 306 into the final training zero-crossed-aligned signals and making the signals sparse (schematically shown in FIG. 1 as signals 125), the final audio samples are digitally sampled at a sampling rate of 48 kHz (the most common sample rate for audio systems).

Sparse Signals for Training an ANN to Detect FE

Figure 4A:
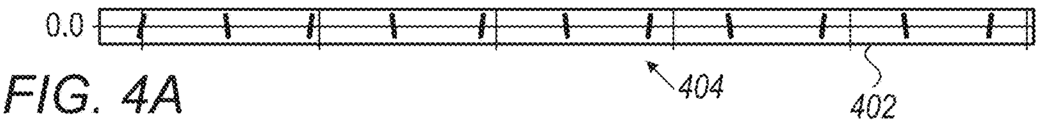
FIGS. 4A and 4B are graphs of two types of sparse training signals, each produced from the short audio signal of FIG. 3, in accordance with an embodiment of the present invention.
Figure 4B:
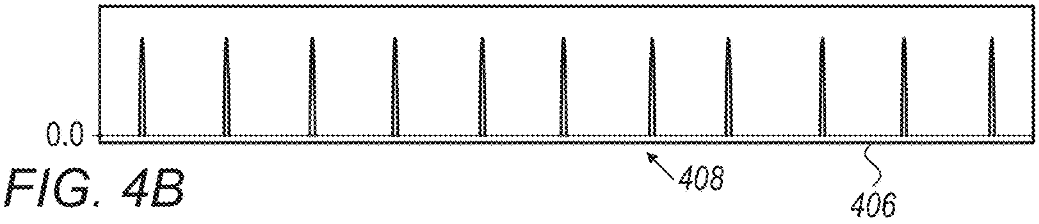

FIGS. 4A and 4B are graphs of two types of sparse training signals, each produced from the short signal 306 of FIG. 3, in accordance with an embodiment of the present invention.

FIG. 4A shows a sparse training signal 402 comprising signal portions 404 derived from the short audio signal 306 by maintaining signal 306 around each zero-crossing interval and discarding signal 306 elsewhere.

FIG. 4B shows a sparse training signal 406 derived from the short audio signal 306 by generating a function 408 having a spike at the zero crossing and discarding the signal 306 elsewhere.

Analysis of the Performance of ANN in Estimating FE

In the field of ML, and specifically the problem of statistical classification, a confusion matrix, also known as an error matrix, is a specific table layout that allows visualization of the performance of an algorithm, typically a supervised learning algorithm (i.e., one that uses labeled training data for learning). Each row of the matrix represents the instances in an actual class while each column represents the instances in a predicted class (or vice versa). The name stems from the fact that it makes it easy to see whether the system is confusing two classes (i.e., commonly mislabeling one as the other).

Figure 5:
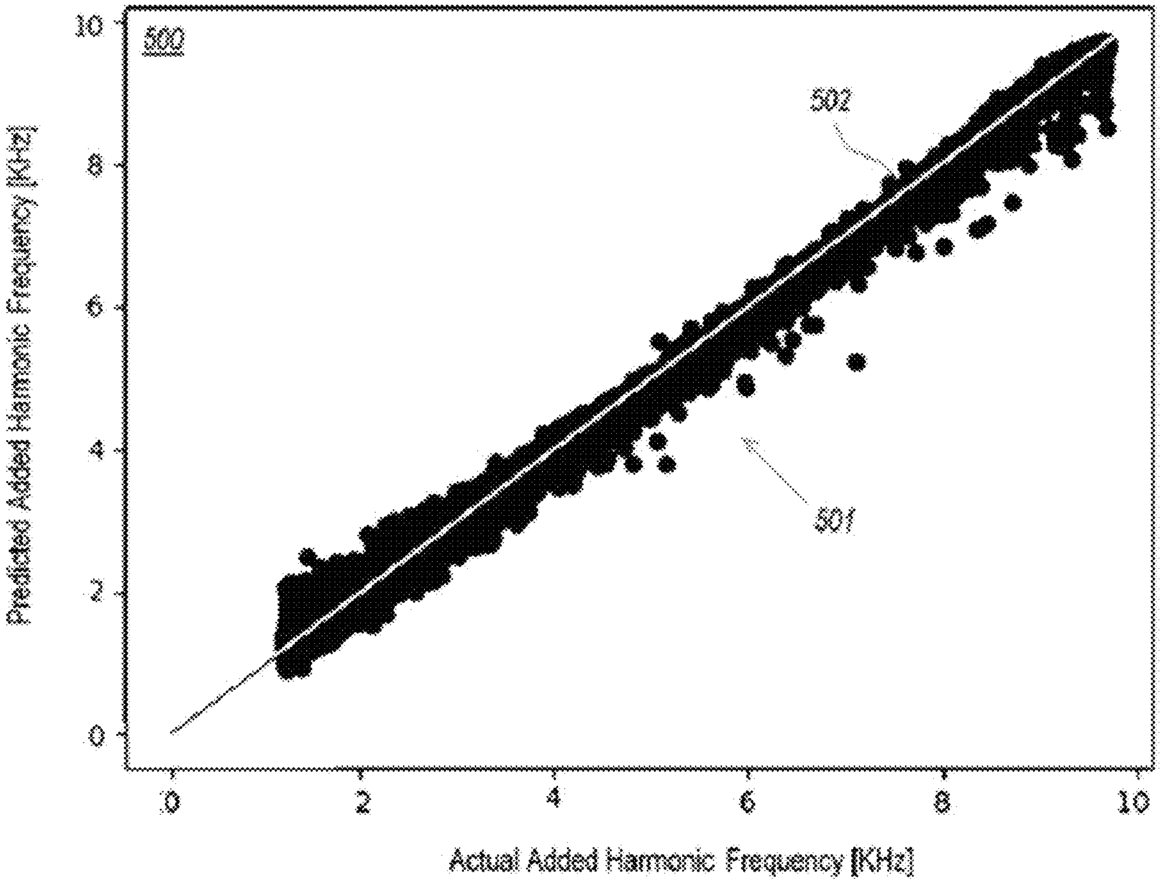
FIG. 5 is a graph comparing detected frequencies of an added harmonics estimated using the system of FIG. 1 to a ground-truth frequencies of the added harmonics, in accordance with an embodiment of the present invention.

FIG. 5 is a graph 500 comparing detected frequencies of an added harmonics estimated using the system of FIG. 1 to a ground-truth frequencies of the added harmonics, in accordance with an embodiment of the present invention. This graph was generated as a part of proof-of-concept testing of the disclosed technique. The frequencies of added harmonics range between 1.1 KHz and 9 KHz. In this example, a data set of size 200,000 was used, each harmonic having more than 10% of the energy level of the fundamental harmonics, and each sample had 5 cycles. A trend line 502 represents the ideal accurate results. High-quality audio systems add harmonics with small amplitudes and noise. The system of FIG. 1 detects added frequencies (501) as low as 0.1% for these added harmonics within the given data set.

As the energy level of the added harmonics increases so much, e.g., to equal that of the fundamental harmonics in case of extreme distortion, the zero crossing, or other indications (e.g., extremums) may not be sufficiently unique to distinguish one added frequency from another. In this case the detection error FA grows substantially. This growth is represented by the vertical width of the added frequency values for the selected data set.

Method of Estimating of FA of a Short Audio Sample

Figure 6:
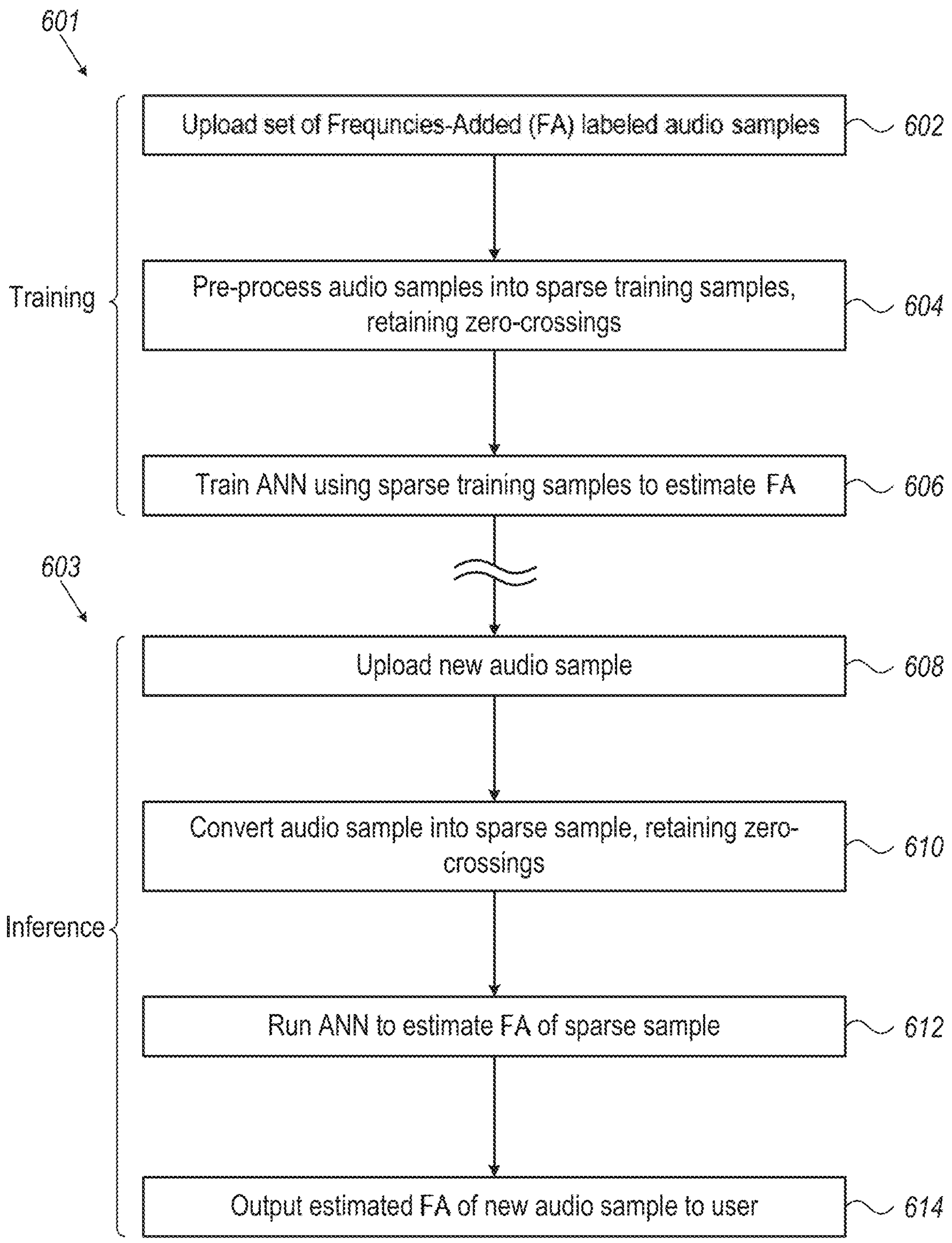
FIG. 6 is a flow chart that schematically illustrates a method for estimating frequencies added (FA) of a short audio sample using the system of FIG. 1 trained with sparse signals, in accordance with an embodiment of the present invention.

FIG. 6 is a flow chart that schematically illustrates a method for estimating the frequencies-added (FA) of a short audio sample 121 using the system of FIG. 1, in accordance with an embodiment of the present invention. The algorithm, according to the presented embodiment, carries out a process that is split between a training phase 601 and an inferencing phase 603.

For clarity of explanation, training phase and inference phase are described as a single flow carried out by system 101. In real-life implementations, training phase 601 may be performed by one system (similar to system 101 or otherwise) and inference phase 603 may be performed by another system (e.g., system 101 of FIG. 1). In such embodiments, system 101 is provided with a pre-trained ML model for ANN 107.

The training phase begins at an uploading step 602, during which processor 108 uploads a set of short (e.g., sliced) audio samples, similar to the 5-cycle short audio sample 306 used in FIG. 3, from memory 109.

At a preprocessing step 604, sparse signal generator 104 transforms each of signals 123 to respective sparse signals 125, each ranging about zero-crossing points only.

In an ANN training step 606, processor 108 trains ANN 107, using the sparse signals outputted by step 604, to estimate values of FA to an audio signal.

Inference phase 603 begins by system 101 receiving, as an input, a short time duration audio sample (e.g., of several milliseconds duration) at an audio sample inputting step 608.

At a preprocessing step 610, sparse signal generator 104 converts the audio sample into a sparse signal (such as those schematically depicted by signals 125).

In ANN inferencing step 612, processor 108 applies the trained ANN to estimate an values of FA in the audio signal.

Finally, at an FE outputting step 614, processor 108 of system 101 outputs the estimated FA to a user, or a processor, to, for example, adjust a parameter of audio apparatus 100 to reduce frequency domain errors.

The flow chart of FIG. 6 is brought purely by way of example, for the sake of clarity. For example, other preprocessing steps, such DC filtration, may be used.

Although the embodiments described herein mainly address audio processing for audio engineering suites and/or consumer grade devices, the methods and systems described herein can also be used in other applications, such as audio quality analysis, filter design or auto-self-control of filters for still-image processing or for video processing, and, mutatis mutandis, encoding and decoding techniques for data compression that are based on, or partially based on, FFT analysis.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
   - a memory, configured to store a machine learning (ML) model that is trained to estimate values of frequencies added (FA) in sparse input signals that have been derived from respective input audio signals, the sparse input signals being indicative of one or more FA in the corresponding input audio signals; and
   - a processor, which is configured to:
     - receive an input audio signal;
     - derive from the input audio signal a sparse input signal indicative of the FA in the input audio signal; and
     - estimate the values of the FA in the input audio signal by applying the trained ML model to the sparse input signal.

2. The system according to claim 1, wherein the processor is configured to derive the sparse input signal from the input audio signal by retaining portions of the input audio signal around zero-crossings of the input audio signal and discarding other portions of the input audio signal.

3. The system according to claim 1, wherein the processor is configured to derive the sparse input signal from the input audio signal by retaining portions of the input audio signal around extremums of the input audio signal and discarding other portions of the input audio signal.

4. The system according to claim 1, wherein the processor is configured to derive the sparse input signal from the input audio signal by retaining portions of the input audio signal around steepest portions of the input audio signal and discarding other portions of the input audio signal.

5. The system according to claim 1, wherein the processor is further configured to derive the sparse input signal from the input audio signal by applying an initial step of phase aligning of the input audio signal to a reference point within the input audio signal.

6. The system according to claim 1, wherein the processor is configured to estimate the values of the FA by detecting frequencies of one or more higher harmonic of the input audio signal.

7. The system according to claim 1, wherein the processor is configured to obtain the input audio signal by receiving the input audio signal.

8. The system according to claim 1, wherein the processor is further configured to filter-out a DC component from the input audio signal.

9. The system according to claim 1, wherein the processor is further configured to normalize the input audio signal.

10. The system according to claim 1, wherein the ML model comprises one of a convolutional neural network (CNN) and a recursive neural network (RNN).

11. The system according to claim 1, wherein the processor is further configured to control, using the estimated values of the FA, an audio system that produces the input audio signal.

12. A system, comprising:
    - a memory configured to store a machine learning (ML) model; and
    - a processor, which is configured to:
      - obtain a plurality of audio signals that are labeled according to respective values of frequencies added (FA) in the signals;
      - derive from the plurality of audio signals a respective plurality of sparse training signals, each sparse training signal being indicative of one or more FA in a corresponding audio signal; and
      - using the sparse training signals, train the ML model to estimate values of the FA.

13. The system according to claim 12, wherein the processor is configured to derive the sparse training signals from the audio signals by retaining portions of the audio signals around zero-crossings of the audio signals and discarding other portions of the audio signals.

14. The system according to claim 12, wherein the processor is configured to derive the sparse training signals from the audio signals by retaining portions of the audio signals around extremums of the input signals and discarding other portions of the audio signals.

15. The system according to claim 12, wherein the processor is configured to derive the sparse training signals from the audio signals by retaining portions of the audio signals around steepest portions of the audio signals and discarding other portions of the audio signals.

16. The system according to claim 12, wherein the processor is further configured to apply an initial step of phase aligning the input audio signals.

17. The system according to claim 12, wherein the processor is configured to obtain the plurality of audio signals by receiving initial audio signals that have first durations, and slicing the initial audio signals into slices having second durations, shorter than the first durations.

18. The system according to claim 12, wherein the processor is further configured to filter-out a DC component from each of the plurality of audio signals.

19. The system according to claim 12, wherein the processor is further configured to normalize each of the plurality of audio signals.

20. The system according to claim 12, wherein the ML model comprises one of a convolutional neural network (CNN) and a recursive neural network (RNN).

21. The system according to claim 19, wherein the CNN classifies the FA according to the values of the FA that label the audio signals.

22. A method, comprising:
    - storing in a memory a machine learning (ML) model that is trained to estimate values of frequencies added (FA) in sparse input signals that have been derived from respective input audio signals, the sparse input signals being indicative of one or more FA in the corresponding input audio signals;
    - receiving an input audio signal;
    - deriving from the input audio signal a sparse input signal indicative of the FA in the input audio signal; and
    - estimating the values of the FA in the input audio signal by applying the trained ML model to the sparse input signal.

23. A method, comprising:
    - storing in a memory a machine learning (ML) model;
    - obtaining a plurality of audio signals that are labeled according to respective values of frequencies added (FA) in the signals;
    - deriving from the plurality of audio signals a respective plurality of sparse training signals, each sparse training signal being indicative of one or more FA in a corresponding audio signal; and using the sparse training signals, training the ML model to estimate the values of the FA.

* * * * *